United States Patent
Loraas et al.

(10) Patent No.: US 6,236,120 B1
(45) Date of Patent: *May 22, 2001

(54) KEYLESS IGNITION SYSTEM WITH WASHOUT FEATURE

(75) Inventors: Orlan J. Loraas, Lisbon; Scott B. Jacobson, Kindred, both of ND (US)

(73) Assignee: Clark Equipment Company, Woodcliff, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,379

(22) Filed: Oct. 9, 1998

Related U.S. Application Data

(63) Continuation of application No. 08/796,882, filed on Feb. 7, 1997, now Pat. No. 5,821,631.

(51) Int. Cl.[7] ........................................ H02G 3/00
(52) U.S. Cl. ................ 307/10.4; 307/10.1; 307/10.2; 307/10.3; 307/10.5; 307/10.6
(58) Field of Search .................... 307/10.1–10.6

(56) References Cited

U.S. PATENT DOCUMENTS

| | | | |
|---|---|---|---|
| 3,544,804 | 12/1970 | Gaumer et al. | 307/10 |
| 3,619,633 | 11/1971 | Brandon | 307/10 AT |
| 3,670,836 | 6/1972 | Tonkowich et al. | 180/114 |
| 3,731,156 | 5/1973 | Watson | 317/134 |
| 3,756,341 | 9/1973 | Tonkowich et al. | 180/114 |
| 3,766,400 | 10/1973 | Walters | 307/10 AT |
| 3,784,839 | 1/1974 | Weber | 307/10 AT |
| 3,796,889 | 3/1974 | Fradkin et al. | 307/10 AT |
| 3,812,403 | 5/1974 | Gartner | 317/134 |
| 3,907,060 | 9/1975 | Burton et al. | 180/114 |
| 3,968,666 | 7/1976 | MacKinnon | 70/243 |
| 3,987,408 | 10/1976 | Sassover et al. | 340/64 |
| 4,107,962 | 8/1978 | MacKinnon | 70/243 |
| 4,150,731 | 4/1979 | Tannenbaum | 180/114 |
| 4,232,758 | 11/1980 | Crosas | 180/287 |
| 4,288,778 | 9/1981 | Zucker | 340/64 |
| 4,292,620 | 9/1981 | Pagane | 340/63 |
| 4,342,024 | 7/1982 | Rossi | 340/64 |
| 4,360,074 | 11/1982 | Parquet | 180/287 |

(List continued on next page.)

FOREIGN PATENT DOCUMENTS 43 15 758 C1    6/1994   (DE).

Primary Examiner—Stephen W. Jackson
Assistant Examiner—Rios Roberto
(74) Attorney, Agent, or Firm—Westman, Champlin & Kelly, P.A.

(57) ABSTRACT

A security system for a vehicle includes a keyboard including a start key and a washout key and adapted to receive a user code. A processor is operably coupled to the keyboard for receiving signals indicative of entry of the user code actuation of the washout key and, wherein the processor provides an output signal if the user code is entered and is followed by actuation of the start key. The processor also provides the output signal if the start key has been entered during an adjustable time period after the vehicle has been turned off. However, if the washout key is actuated, the processor does not provide the output signal upon actuation of the start key during the time period after the vehicle is turned off. A controlled device is operably connected to the processor and controls a component of the vehicle to allow the vehicle to start when the output signal from the processor is received.

20 Claims, 4 Drawing Sheets

U.S. PATENT DOCUMENTS

| | | | | |
|---|---|---|---|---|
| 4,463,340 | | 7/1984 | Adkins et al. | 340/64 |
| 4,553,511 | | 11/1985 | Hayakawa et al. | 123/179 B |
| 4,645,939 | | 2/1987 | Robinson | 307/10 AT |
| 4,682,062 | * | 7/1987 | Weinberger | 307/10 |
| 4,690,240 | | 9/1987 | Russo | 180/287 |
| 4,691,801 | | 9/1987 | Mann et al. | 180/287 |
| 4,736,113 | | 4/1988 | Leu | 307/10 AT |
| 4,738,333 | | 4/1988 | Collier et al. | 180/272 |
| 4,809,199 | | 2/1989 | Burgess et al. | 364/550 |
| 4,834,207 | | 5/1989 | Havenhill et al. | 180/287 |
| 4,852,680 | | 8/1989 | Brown et al. | 180/287 |
| 4,888,575 | | 12/1989 | De Vaulx | 340/426 |
| 4,932,494 | | 6/1990 | Chandler | 180/287 |
| 4,991,683 | * | 2/1991 | Garreto et al. | 180/287 |
| 5,006,843 | | 4/1991 | Hauer | 340/825.31 |
| 5,041,510 | | 8/1991 | Gotanda | 340/426 |
| 5,079,435 | | 1/1992 | Tanaka | 307/10.2 |
| 5,138,986 | * | 8/1992 | Aguilar | 123/179.3 |
| 5,193,641 | | 3/1993 | Durrell | 180/287 |
| 5,481,253 | * | 1/1996 | Phelan et al. | 340/825.31 |
| 5,547,039 | | 8/1996 | Berger et al. | 180/287 |
| 5,561,332 | | 10/1996 | Udo et al. | 307/10.3 |
| 5,583,383 | | 12/1996 | Denz et al. | 307/10.2 |
| 5,640,057 | | 6/1997 | Hirata et al. | 307/10.5 |
| 5,821,631 | * | 10/1998 | Loraas et al. | 307/10.4 |

* cited by examiner

KEYLESS IGNITION SYSTEM WITH WASHOUT FEATURE

This is a continuation of U.S. patent application Ser. No. 08/796,882, filed on Feb. 7, 1997, now U.S. Pat. No. 5,821,631.

BACKGROUND OF THE INVENTION

The present invention relates in general to vehicle anti-theft security systems. More particularly, the present invention relates to a keyless ignition system where an operator must provide a preselected code to start and operate the vehicle.

Self-powered vehicles used in the construction and agricultural vehicles are subject to theft and operation by unauthorized persons. Unlike most highway vehicles, which typically are only operated by one or a few individuals over a lengthy period of time, selfpowered construction equipment and certain types of agricultural equipment are often operated by many persons, especially when the equipment is moved between work sites. Workers in the construction and agricultural fields are often employed on a short-term basis and tend to change employers frequently, which compounds the difficulty of maintaining vehicle security.

Keyless systems for allowing operation of a vehicle without using a conventional key have long been known. These keyless systems typically require the entry of a proper sequence of key depressions through an array of switches, after which the engine starting controls operate normally. These systems obviate the need for an authorized user of the vehicle to carry keys to gain access. Some systems developed for the automotive industry have used a combination of a conventional key along with a keyboard to accept and recognize a preselected code. After entry of the preselected code, the key can be turned in a conventional manner to start the engine. In the event of the car stalling, a timer is initiated that allows the car to be started without re-entry of the preselected code. Thus, if the vehicle does stall in traffic, it can be turned on simply by turning the ignition key as is conventional. After a preselected period has lapsed, the system will enter a secured mode where the correct preselected code must be entered to start the vehicle.

Many systems further allow the system to be deactivated, for example, while the vehicle is being serviced or driven for other reasons. Although handy, placement of the system in an unsecured mode makes the vehicle particularly vulnerable. If the operator forgets to reactivate the security mode, the vehicle is easily susceptible to theft.

SUMMARY OF THE INVENTION

In a first embodiment, a security system for a vehicle includes a keyboard for receiving input codes that comprise an access code and a start code. As used herein an access code is either a "user code" or a "master code". A user code is known to an operator of the vehicle and allows the vehicle to be started. A master code is known to the owner of the vehicle and allows the owner to change parameters of the system that can not be changed by only entering the user code.

In the first embodiment, a processor is operably coupled to the keyboard for receiving signals indicative of each access code and the start code, wherein the processor provides an output signal if an input code corresponds to the access code and is followed by the start code. The processor also provides the output signal if the start code has been entered during an adjustable time period after the vehicle has been turned off. A controlled device is operably connected to the processor and controls a component of the vehicle to allow the vehicle to start when the output signal from the processor is received.

In a second embodiment, a keyless security system for a vehicle includes a keyboard for receiving input codes that comprise access codes and a start code, and a controlled device for controlling a component of the vehicle to allow the vehicle to start. A processor is operably coupled to the keyboard for receiving signals indicative of each access code and the start code and is operably coupled to the controlled device for providing an output signal for controlling the controlled device. The processor provides an output signal only if an input code corresponds to an access code and is followed by the start code, or if the start code has been entered during an adjustable time period after the vehicle has been turned off. The time period is adjusted through entry of the master code.

DETAILED DESCRIPTION OF THE PREFERRED EMBODIMENTS

Figure 1:
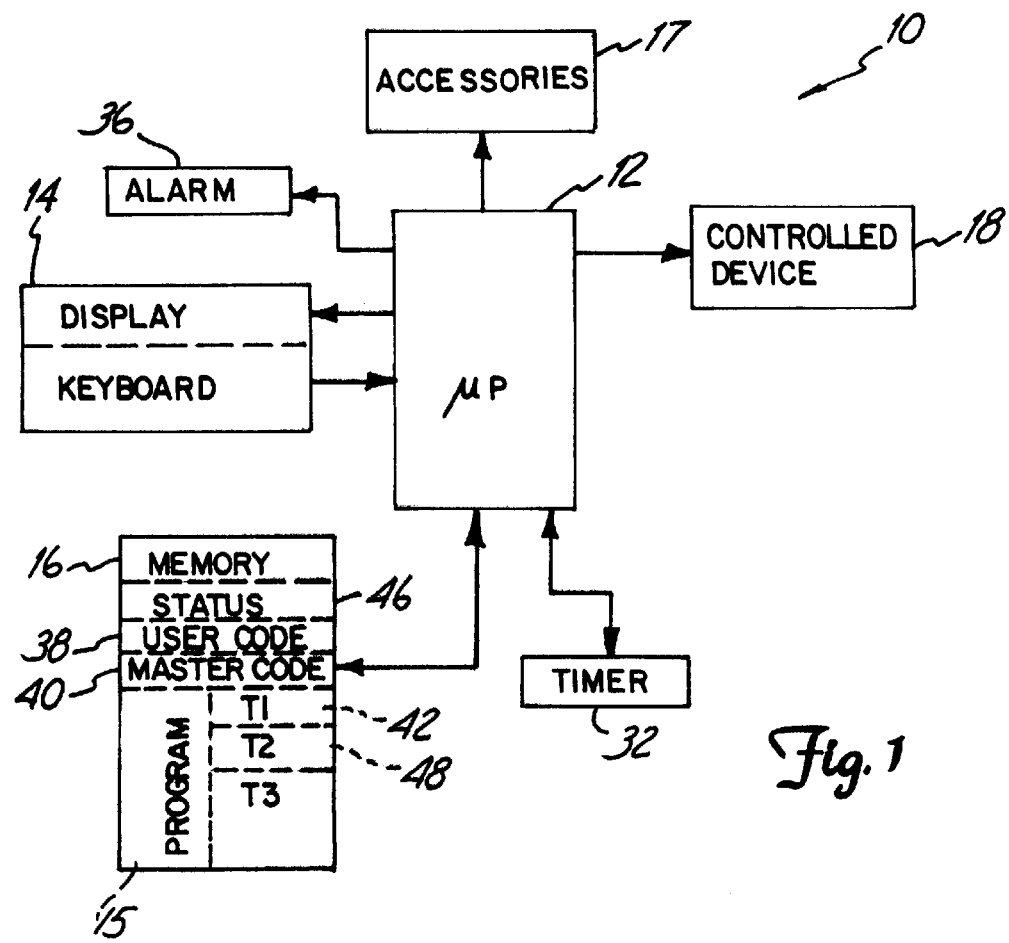
FIG. 1 is a block diagram of a first embodiment of the present invention.
Figure 2:
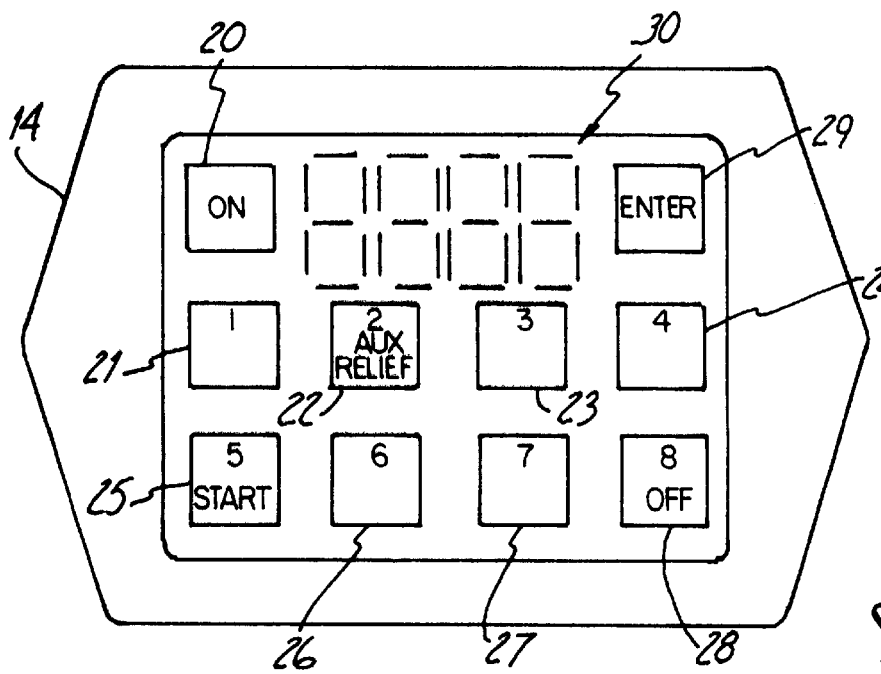
FIG. 2 is a front view of a keypad used with the first embodiment of the present invention.

FIGS. 1 and 2 illustrate an embodiment of a security system of the present invention generally at 10. The security system 10 includes a microprocessor 12 that receives signals from a keyboard/display panel 14 and suitable memory 16. Using a program 15 stored in the memory 16, the microprocessor 12 receives input codes from the keyboard 14. If the input codes correspond to an access code, the microprocessor 12 provides suitable control signals to a controlled device indicated at 18 that allows a vehicle, not shown, that the security system 10 is attached to, to be started. The security system 10 obviates the need for a conventional key switch, and in effect, replaces the key switch thereby providing a keyless ignition system.

As used herein an access code is either a "user code" or a "master code". A user code is known to an operator of the vehicle and allows the vehicle to be started. A master code is known to the owner of the vehicle and allows the owner to change parameters of the system that can not be changed by only entering the user code.

The controlled device 18 can be any device that has two selectable operating states, one of which will prevent the vehicle from starting. For example, the controlled device 18 can be a starter relay, a fuel cut-off switch, an ignition module, or any other suitable device necessary to operate the vehicle. The control signals provided by the microprocessor 12 are normally low-power signals used to control higher power devices. The security system 10 is particularly well suited for use with construction vehicles such as skid steer loaders.

It will be appreciated that the circuitry illustrated in FIG. 1 could be formed as a single integrated circuit. It will also be appreciated that, instead of using the microprocessor 12 illustrated, an array of logic devices designed for the flow chart of FIG. 3 could also be used. However, the microprocessor 12 is particularly attractive where a microprocessor has already been incorporated in the design of the vehicle, to control other functions, such as those relating to engine operation. The amount of computing time required to perform the security system 10 is small in comparison with the computing power of a microprocessor so that a single microprocessor could control all of the electrically controlled functions of the security system 10, in addition to operating other accessories 17 and carrying out other tasks of the vehicle.

FIG. 2 illustrates a close-up view of a first suitable keyboard and integrated display unit 14. In the embodiment illustrated, the keyboard 14 includes ten individual keys 20, 21, 22, 23, 24, 25, 26, 27, 28 and 29. The keys 20–29 can take many forms, for example, the keys 20–29 can be mechanical switches or can be touch-sensitive or pressure-sensitive contact areas of a larger single panel. In the embodiment illustrated, the key 20 is used to "wake-up" the security system 10 and indicate to the microprocessor 12 that input codes will be entered. The keys 21–28 are numbered 1–8, respectively, and are used sequentially to form possible access codes. The keys 22, 25 and 28 are also used to enter commands to the microprocessor 12 for various functions. Activation of keys 25 and 28 are described below. The key 22 is used to relieve pressure in hydraulic lines for powering remote equipment that can be connected to the vehicle. The key 29 is an "enter key" and is used to signify the end of an input request. A display device 30 such as an LCD or LED decimal display 30 is provided to indicate the operating state of the microprocessor 12, request inputs and/or reflect keys depressed during operation of the keys 21–28.

Figure 3:
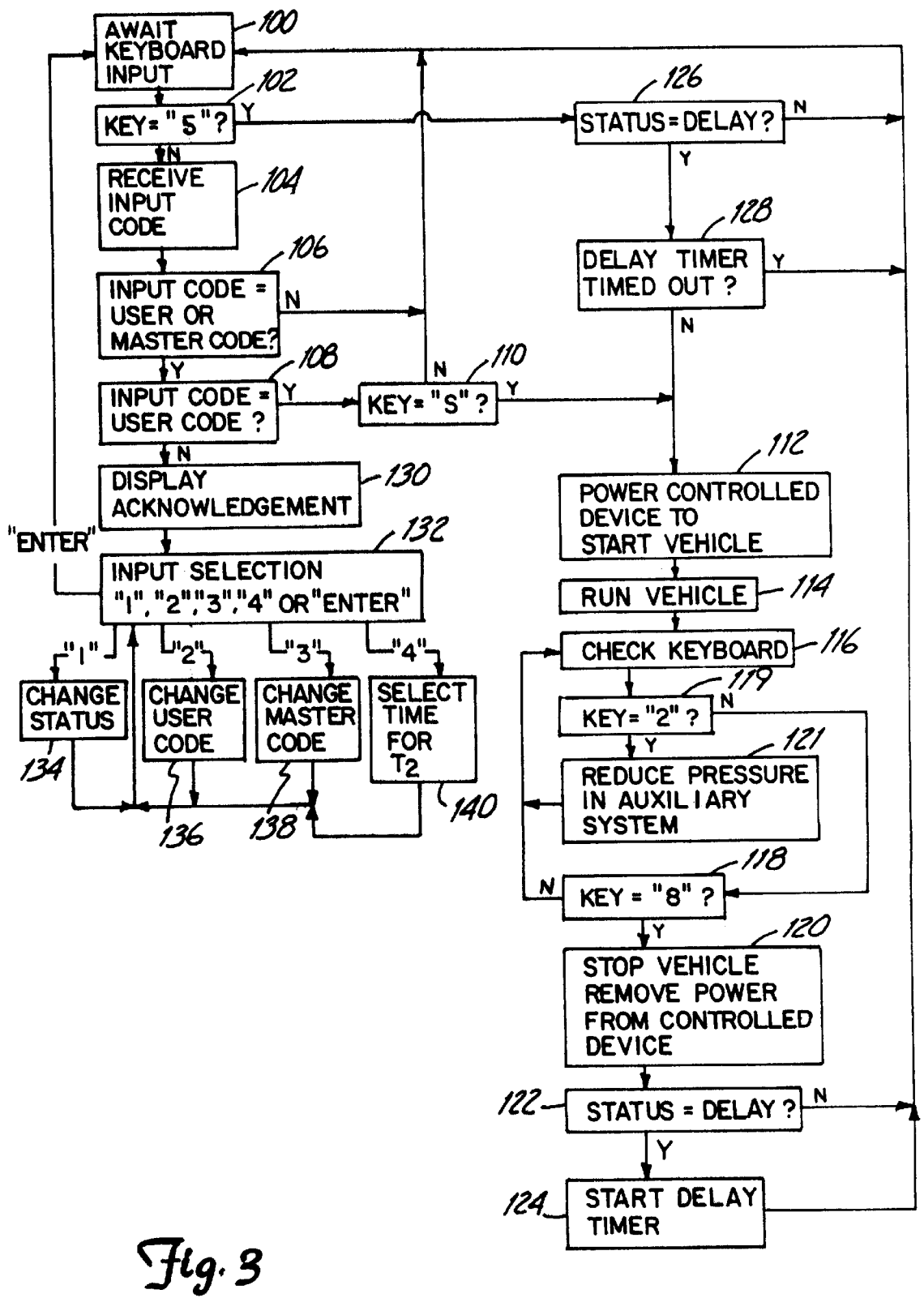
FIG. 3 is a first flow chart of the sequence of operations followed by an apparatus of the first embodiment of the present invention.

The logic of the computer program 15 being implemented by the microprocessor 12 is illustrated in a flow diagram of FIG. 3. The system 10 has five operating states or modes that include a "secured sleep mode," a "input code mode," a "vehicle run mode," a "non-secured, timed, start-ready mode," and a "parameter adjustment mode." Initially, the system 10 including the keyboard 14 is in the "secured sleep mode" as indicated by a block 100. In this mode, the vehicle is turned off and secured in that it can not be started without first providing a valid code sequence. During this mode, the microprocessor 12 is waiting for actuation of the key 20 indicating that the microprocessor 12 should enter the "input code mode." In the "input code mode," the microprocessor 12 waits for sequential operation of any of the keys 21–28. As will be described in detail below, actuation of the key 25 at a decision block 102 allows for immediate operation of the vehicle without entering in the user code or the master code. Operation of the vehicle is only available if a selected time period $T_2$ has not elapsed. In the embodiment illustrated, a delay timer 32 is used to measure the selected time period, and provides a signal to the microprocessor 12 where the selected time period $T_2$ has expired.

Assuming for the moment that actuation of the key 25 has not occurred, program flow continues to an input block 104. At input block 104, the microprocessor 12 receives from the keyboard 14 a sequence of key actuations representative of an input code. Completion of one input code is represented by actuation of the key 29. After actuation of the key 29, the input code is compared with the user code and the master code indicated at a decision block 106 and stored in memory 16 at 38 and 40 respectively. If the input code received at input block 104 is not valid, program flow returns to input block 100 and re-enters the "secured sleep mode" and, if desired, the microprocessor activates an alarm 36.

If the input code matches the user code or the master code, program flow continues to a decision block 108. At decision block 108, the microprocessor 12 ascertains whether the user code or the master code has been entered. In the embodiment illustrated, the microprocessor 12 compares the input code with the user code 38. If the input code matches the user code 38, program flow continues to a decision block 110. At decision block 110, the microprocessor 12 awaits actuation of the key 25 signifying that the user is prepared to operate the vehicle. Upon actuation of the key 25, the microprocessor 12 provides suitable control signals to the controlled device 18 at a block 112 that enables the vehicle to be started and operated normally. The timer 32 can be used at block 110 to ensure that the key 25 is actuated within a prescribed time period $T_1$ stored in memory 16 at 42. If the key 25 is not actuated within the time period $T_1$, program flow returns back to the "secured sleep mode" at block 100.

The "vehicle run mode" is illustrated in FIG. 3 at a block 114. With the vehicle operating, program flow cycles between blocks 116, 119, 121 and 118. The microprocessor 12 monitors for actuated of the key 22 or the key 28. Activation of the key 22 ("AUX RELIEF") reduces pressure in an auxiliary hydraulic system to allow an attachment to be uncoupled from the vehicle. If the key 22 has been actuated, the system 10 reduces the pressure in the auxiliary hydraulic system at block 121. When the operator actuates the key 28, program flow continues to block 120 where the microprocessor 12 provides suitable control signals to the controlled device 18 or ceases transmission of the control signals provided to place the system 10 in an operating state in order to prevent the vehicle from being operated.

Program flow then continues to decision block 122 whereat the microprocessor 12 ascertains if non-secured starting of the vehicle is available. In the embodiment illustrated, the availability of non-secured starting of the vehicle is stored as a Boolean variable "status" in memory 16 at 46. The Boolean variable "status" has two possible values "delay" indicating that non-secured starting is available for a selected time period $T_2$ stored in memory 16 at 48, and "no delay" indicating that non-secured starting is not available. Assuming that non-secured starting is not available, program flow returns back to block 100 and the microprocessor returns to the "sleep secured mode." If, on the other hand, non-secured starting is available, the microprocessor 12 initiates the delay timer 32 at block 124 and then returns to the "sleep secured mode" at block 100.

Non-secured starting of the vehicle is available at block 102 with actuation of the key 25. Upon actuation of the key 25, program flow continues to decision block 126 whereat the microprocessor 12 ascertains if non-secured starting is available by checking the value of the "status" variable. If non-secured starting is available, program flow continues to decision block 128 where the microprocessor 12 ascertains if the delay timer 32 has timed-out. If the delay timer 32 has timed-out (exceeded the time period $T_2$), program flow returns back to the "sleep secured mode" at block 100. If, on the other hand, the delay timer 32 has not timed-out, program flow continues to block 112 where the microprocessor 12 provides suitable control signals to the controlled device 18 to allow the vehicle to be operated.

It should be understood that at any time during the starting sequence identified by program flow through blocks 100, 102, 106, 108, 110 and 112, or through the "non-secured" starting path identified by blocks 100, 102, 126, 128 and 112, the microprocessor 12 can ensure that the vehicle is properly configured for operation.

Operating parameters such as the user code 38, the master code 40, the value of the "status" variable, and the length of the time period $T_2$ for non-secured starting can be changed or adjusted with entry of the master code 40 as represented by program flow from decision block 108 to block 130. This operating mode can be entered with or without the vehicle engine operating. At block 130, the microprocessor 12 provides an acknowledgement, via the display 14, to indicate to the operator that the master code has been entered. Program flow then continues to block 132. As represented by block 132, only five different key actuations are recognized by the microprocessor 12. They are key 21, key 22, key 23, key 24, and key 29. Actuation of the key 21 by the operator changes the value of the "status" variable between "Delay" and "No Delay" at block 134. The microprocessor 12 records in memory 16 at 46 the selected mode chosen by the operator and returns program flow to block 132.

If the key 22 is depressed, program flow continues to block 136 where the operator is prompted for a new user code. Upon actuation of the "enter" key, after a desired sequence of keys 21–28 have been depressed, the microprocessor 12 replaces the old user code with the new user code stored at 38 in memory 16 and returns program flow to the block 132.

If the key 23 is depressed, program flow continues to block 138 where the operator is prompted for a new master code. Upon actuation of the "enter" key, after a sequence of keys 21–28 have been depressed, the microprocessor 12 replaces the old master code with the new master code stored at 40 in memory 16 and returns program flow to the block 132. In a preferred embodiment, the master code is not changeable by the owner and is recorded by the manufacturer, being crossreferenced to the vehicle's serial number. In the event the owner forgets the master code, the manufacturer can then provide it.

If the key 24 is actuated, program flow continues to block 140 where the operator is then allowed to change the duration of the time period $T_2$ for non-secured starting. The operator can either enter a desired duration by using the keys 21–28, which can, in one embodiment, represent hours with a maximum duration of eight hours. Otherwise, repeated actuation of the key 24 can sequentially display a plurality of preselected time periods. Pressing the key 29 stores the selected value for time period $T_2$ in memory 16 at 48 and returns program flow to block 132.

If the key 29 is depressed at block 132, the program exits the "Parameter Adjustment Mode" and returns to the "secured sleep mode" at the block 100.

Figure 4:
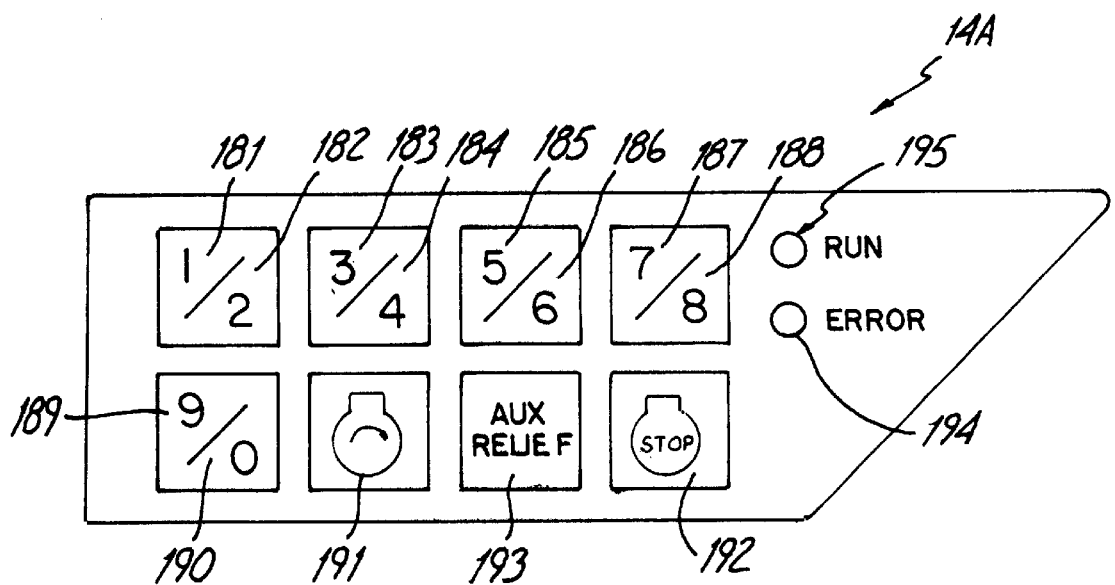
FIG. 4 is a front view of a keypad used with a second embodiment of the present invention.

FIG. 4 illustrates a second suitable keyboard and integrated display unit 14A. In the embodiment illustrated in FIG. 4, the keyboard 14A includes keys 181, 182, 183, 184, 185, 186, 187, 188, 189 and 190. The keys 181–190 are numbered and are used sequentially to form input codes. A key 191 is provided to initiate starting by providing a start code if a valid user or master code has been entered. The engine of the vehicle is turned off when a key 192 is depressed. An "AUX RELIEF" key 193 is provided to release pressure in an auxiliary hydraulic system, as described above. Indications of improper operation of the keyboard 14A are provided to the operator through a LED 194 identified as "ERROR." Proper operation of the keyboard 14A is indicated through an LED 195 labeled "RUN."

Figure 5:
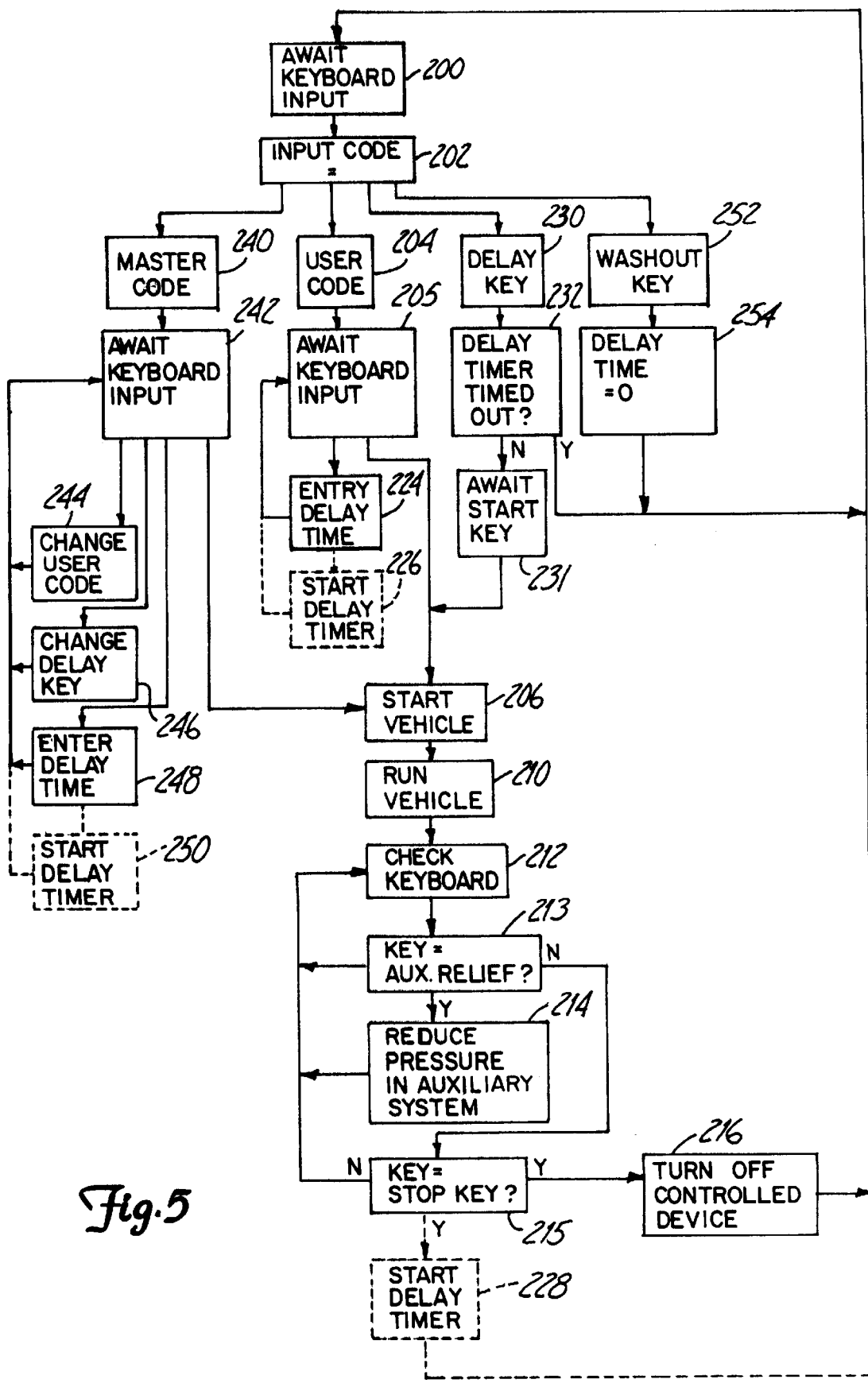
FIG. 5 is a second flow chart of the sequence of operations followed by an apparatus of the present invention.

FIG. 5 illustrates a second flow diagram of the computer program 15 implementable by the microprocessor 12.

Operation of the system 10 pursuant to the flow diagram of FIG. 5 is as follows. In the embodiment illustrated, the system 10 has five operating states or modes that include a "secured sleep mode," a "command input mode," a "vehicle run mode," a "timed start-ready mode" and "parameter adjustment modes." Initially, the system 10 including the keyboard 14A is in the "secured sleep mode" as indicated by block 200. In this mode, the vehicle is turned off and secured in that it cannot be started without first providing a valid user or master code. During this mode, the microprocessor 12 is waiting for actuation of any of the keys 181–190. Upon activation of any key 181–190, the microprocessor 12 enters the "command input mode." In the "command input mode," the microprocessor 12 checks the key depressed with allowable commands, and if necessary, waits for additional keys, which taken in sequence with the first key, represent an input Code. At block 202, the microprocessor 12 compares the input code with a number of possible valid codes, each of which will be discussed below.

If the input code equals the user code, as indicated at block 204, the microprocessor awaits further input from the operator, as indicated at block 205. If the operator then activates the key 191, program flow continues to block 206 whereat the microprocessor 12 provides suitable control signals to the control device 18 that enables the vehicle to be started and operated normally.

The "vehicle run mode" is illustrated in FIG. 5 at a block 210. With the vehicle operating, the system 10 awaits further inputs to the keyboard 14A at block 212. If activation of the "AUX RELIEF" key 193 is detected at block 213, program flow continues to block 214 where the microprocessor 12 provides a control signal to suitable valves to reduce pressure in the auxiliary hydraulic system. If activation of the stop key 192 is detected at block 215, indicating that the vehicle operator desires to turn off the vehicle, program flow continues to block 216 where the microprocessor 12 provides suitable control signals to the controlled device 18 or ceases transmission of the control signals provided to the controlled device 18 in order to place the vehicle in an operating state that prevents the vehicle from being operated. Program flow then continues back to input block 200.

Referring back to input block 205, if the operator has entered a preselected code as determined at block 205, the delay time $T_2$ can be adjusted at block 224. For example, activation of one of the keys 181–190 following the preselected code indicates to the system 10 that the delay time $T_2$ should equal the numerical value in hours of the key depressed.

The delay timer 32 can be activated following entry of the delay time at block 224 represented by the dashed block 226. In this embodiment, the delay timer 32 would run continuously whether the vehicle is running or not. Once the delay timer 32 has timed out (exceeded $T_2$), the operator then must reenter a new delay time in order to reset the delay timer 32.

The delay timer 32 can also be activated at block 228 after the vehicle has been turned off. In this alternate embodiment, the delay timer 32 runs each time the vehicle is turned off.

As with the embodiment illustrated in FIG. 3, use of the delay timer 32 allows the operator to quickly restart the vehicle without entry of either the user code or the master code. In the embodiment illustrated, a "Delay Key" represented at block 230, must be depressed prior to activation of the start key 191. Use of the delay key inhibits starting the vehicle inadvertently by activation of the start key 191 as well as provides a minimal level of security to prevent unauthorized operation of the vehicle. As illustrated in FIG.

5, if the Received Code at block 202 equals the delay key, which can be any one of the keys 181–190, or a short sequence thereof, the system 10 ascertains whether the delay timer 32 has timed out at decision block 232. If the delay timer 32 has timed out, program flow returns to block 200. If the delay timer 32 has not timed out, program flow continues to block 231 and the system 10 awaits activation of the start key 191.

Returning back to block 202, if the operator has entered the master code at block 202, program flow continues through block 240, representing entry of the master code, to block 242 whereat the operator can select different parameters to adjust. For example, the operator can change the user code as represented at block 244, or change the delay key as represented at block 246. The operator can also enter a delay timer at block 248 and start the delay timer at block 250, options of which were available with entry of the user code. When the operator has adjusted all desired parameters, program flow returns to block 242. With activation of the start key 191, the program flow continues to block 206. In t his embodiment, the master code is unchangeable for the reasons discussed above.

In the embodiment illustrated, a "washout key" is provided to disable the delay timer 32. The washout key can be a separate key or any one of the keys 181–190. As represented at block 252, the washout key is activated either when the vehicle is turned off, as illustrated, or while the vehicle is running. The washout key is particularly advantageous for rental shop owners that rent the vehicle for a period of time to customers. In this manner, after the vehicle has been returned to the rental shop, the owner can activate the washout key to prevent delayed starting by setting the delay time $T_2$ to zero at block 254. Those skilled in the art will appreciate that other status variables can be used and set to prevent delayed starting, as shown on block 256. Alternatively, activation of the washout key can also render the user code invalid, as shown on block 258.

Although the present invention has been described with reference to preferred embodiments, workers skilled in the art will recognize that changes may be made in form and detail without departing from the spirit and scope of the invention.

What is claimed is:

1. A security system for a vehicle comprising:
   a keyboard including a start key and a washout key and adapted to receive a user code;
   a processor operably coupled to the keyboard for receiving signals indicative of entry of the user code, actuation of the start key and actuation of the washout key, wherein the processor provides an output signal if the user code is entered and is followed by actuation of the start key, but wherein, if the washout key is actuated, the processor does not provide the output signal upon further entry of the user code followed by actuation of the start key; and
   a controlled device operably connected to the processor and controlling a component of the vehicle to allow the vehicle to start when the output signal from the processor is received.

2. The system of claim 1 wherein the processor invalidates the user code upon actuation of the washout key.

3. The system of claim 1 wherein the processor provides the output signal if the start key is actuated during a delay period which commences when the vehicle is turned off.

4. The system of claim 3 wherein the delay period is adjustable in a range from zero to a selected maximum value.

5. The system of claim 3 wherein the delay period is selected from a plurality of selected time periods.

6. The system of claim 3 wherein the processor eliminates the delay period if the washout key is actuated.

7. A security system for a vehicle comprising:
   a keyboard including a start key and a washout key and adapted to receive a user code;
   a processor operably coupled to the keyboard for receiving signals indicative of entry of the user code, actuation of the start key and actuation of the washout key, wherein the processor provides an output signal if the user code is entered and is followed by actuation of the start key, wherein the processor provides the output signal if the start key is actuated during a delay period of a predetermined duration that commences when the vehicle is turned off, but wherein, if the washout key is actuated, the processor eliminates the delay period; and
   a controlled device operably connected to the processor and controlling a component of the vehicle to allow the vehicle to start when the output signal from the processor is received.

8. The system of claim 7 wherein the processor invalidates the user code upon actuation of the washout key.

9. The system of claim 7 wherein the delay period is adjustable in a range from zero to a selected maximum value.

10. The system of claim 7 wherein the delay period is selected from a plurality of selected time periods.

11. The system of claim 7 wherein the processor sets the duration of the delay period to substantially zero if the washout key is actuated.

12. The system of claim 7, further comprising a memory device storing a status variable indicative of whether non-secured starting is available, wherein the processor provides the output signal if the start key is actuated during the delay period and the status variable has a first value, and wherein the processor gives the status variable a second value, not equal to the first value, if the washout key is actuated.

13. A method for starting a vehicle comprising:
   providing a keyboard including a start key and a washout key and adapted to receive a user code;
   detecting actuation of the start key and the washout key and entry of the user code;
   providing an output signal if the user code is entered and is followed by actuation of the start key;
   providing an output signal if the start key is actuated during a delay period of a predetermined duration that commences when the vehicle is turned off;
   eliminating the delay period if the washout key is actuated; and
   controlling a component of the vehicle to allow the vehicle to start as a function of the output signal.

14. The method of claim 13 and further comprising invalidating the user code upon actuation of the washout key.

15. The method of claim 13 wherein the delay period is adjustable in a range from zero to a selected maximum value.

16. The method of claim 13 wherein the delay period is selected from a plurality of selected time periods.

17. The method of claim 13 wherein eliminating the delay period comprises setting the duration of the delay period to substantially zero.

18. A security system for a vehicle comprising:
   a keyboard adapted to receive a user code and including a start key and a washout key that is not a codeinput;

a processor operably coupled to the keyboard for receiving signals indicative of entry of the user code, actuation of the start key and actuation of the washout key, wherein the processor provides an output signal if the user code is entered and is followed by actuation of the start key, but wherein, if the washout key is actuated, the processor does not provide the output signal upon further entry of the user code followed by actuation of the start key; and a controlled device operably connected to the processor and controlling a component of the vehicle to allow the vehicle to start when the output signal from the processor is received.

19. The system of claim 18 wherein the processor invalidates the user code upon actuation of the washout key.

20. The system of claim 18 wherein the processor provides the output signal if the start key is actuated during a delay period which commences when the vehicle is turned off and wherein the processor eliminates the delay period if the washout key is actuated.

* * * * *